United States Patent

[11] 3,604,953

[72] Inventors Philip M. Carmody
Roselle Park;
Dennis J. Lynes, Madison, both of, N.J.

[21] Appl. No. 824,991
[22] Filed May 15, 1969
[45] Patented Sept. 14, 1971
[73] Assignee Bell Telephone Laboratories, Incorporated
Murray Hill, N.J.

[54] REGENERATIVE SWITCHING CIRCUITS USING THE CHARGE STORAGE CHARACTERISTICS OF PN JUNCTIONS TO PERFORM THE SWITCHING AND TIMING FUNCTIONS
10 Claims, 3 Drawing Figs.

[52] U.S. Cl. .......... 307/273, 307/280, 307/281, 307/300, 307/319, 331/111, 331/113
[51] Int. Cl. .......... H03k 3/26
[50] Field of Search .......... 307/273, 281, 319, 280, 300; 331/111, 113

[56] References Cited

UNITED STATES PATENTS

| | | | |
|---|---|---|---|
| 3,106,644 | 10/1963 | Retzinger | 307/281 X |
| 3,157,842 | 11/1964 | Hoeks | 307/281 X |
| 3,171,983 | 3/1965 | Hickey | 307/281 X |
| 3,299,294 | 1/1967 | Koehler | 307/219 X |

*Primary Examiner*—Stanley D. Miller, Jr.
*Attorneys*—R. J. Guenther and Kenneth B. Hamlin

ABSTRACT: A regenerative switching circuit having two active switching elements uses the charge storage and current limiting capabilities of a PN junction to perform the switching and timing functions. When the circuit is in one state, a forward current flows through a PN junction associated with one of the switching elements, and charge is stored near the junction. When the circuit is switched to its other state, a reverse current flows through the junction for a predetermined period until the stored charge is depleted, whereupon the current is blocked and the circuit reverts to its original state.

PATENTED SEP 14 1971 3,604,953

INVENTORS P. M. CARMODY
D. J. LYNES
BY D. E. Snedeker
ATTORNEY

REGENERATIVE SWITCHING CIRCUITS USING THE CHARGE STORAGE CHARACTERISTICS OF PN JUNCTIONS TO PERFORM THE SWITCHING AND TIMING FUNCTIONS

BACKGROUND OF THE INVENTION

1. Field of the Invention

This relates to regenerative switching circuits and particularly to regenerative switching circuits which are completely integrable.

2. Description of the Prior Art

Regenerative switching circuits, that is, astable and monostable circuits, are basic building blocks of electronic devices and systems. They are used for digital control and wave-shaping functions in almost every phase of electronics. In line with the current trend toward lighter and less bulky apparatus in the electronic art, it would be advantageous to miniaturize regenerative circuits as much as possible. Because of the necessity for bulky timing capacitors, however, integration of this type of circuit has proved difficult.

SUMMARY OF THE INVENTION

Accordingly, it is an object of this invention to provide regenerative switching circuits which are totally integrated.

It is another object of this invention to eliminate timing capacitors from regenerative switching circuits.

These objects are achieved in three illustrative regenerative switching circuit embodiments in which the timing function is performed by PN junctions which are associated with at least one of the active switching elements. In two of the circuits the timing function is provided by the PN junction included in a charge storage diode, that is, a diode having a long minority carrier lifetime; in the third the collector-base junction of a transistor is used for this purpose. When each of these circuits is in one state, a current flows through one of the active switching elements and in the forward direction through the PN junction associated therewith, thereby causing charge to be stored in the vicinity of the PN junction. When the circuit is switched to its other state, current flow is transferred to a second switching element and a reverse current flows through the PN junction. The PN junction permits a reverse current to flow therethrough until the charge previously accumulated is depleted. When this occurs, current flow through the second switching element ceases and the circuit is switched back to its initial state. Accordingly, by using a PN junction in this manner, the need for timing capacitors in astable or monostable circuits is eliminated.

BRIEF DESCRIPTION OF THE DRAWING

The objects and advantages of this invention will become more fully apparent by reference to the following detailed description and the drawing in which.

DETAILED DESCRIPTION

Figure 1:
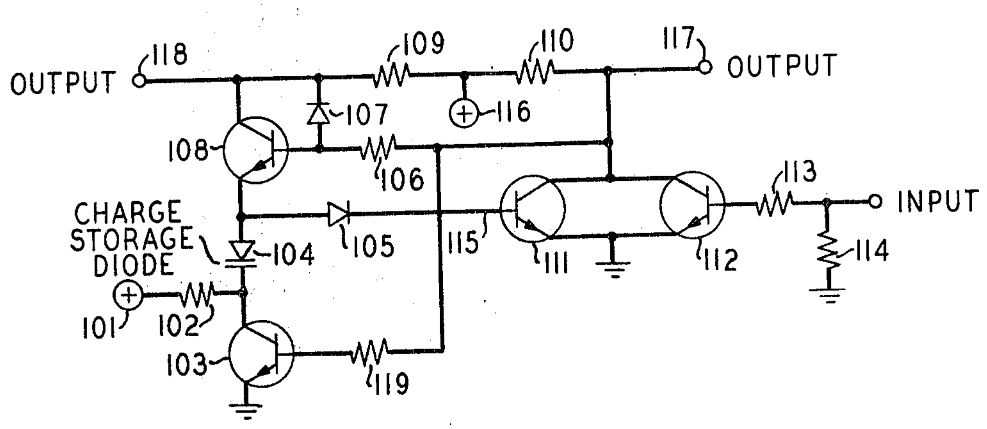
FIG. 1 is a schematic diagram of a monostable circuit constructed in accordance with the invention.

A monostable circuit is shown in FIG. 1 wherein transistors 108 and 103 from one active switching element and transistor 111 forms another active switching element. The input terminal is connected through resistor 114 to ground and through resistor 113 to the base of transistor 112. The collector and emitter of transistor 112 are connected respectively to the collector and emitter of transistor 111, and the emitters of transistors 111 and 112 are connected to ground. The collectors of transistors 111 and 112 are connected to output terminal 117 and through resistor 110 to positive voltage source 116.

One of the active switching elements contains a conduction path running from positive source 116 through resistor 109, transistor 108, charge storage diode 104, and transistor 103 to ground. Charge storage diode 104, which is poled in the forward direction with respect to positive source 116, is any one of a variety of diodes characterized by a long minority carrier lifetime. When such a diode conducts a forward current, charge is accumulated near the PN junction thereof. If a reverse voltage is then applied the diode presents a small impedance and will conduct a reverse current for a predetermined period of time, determined in part by the properties of the particular diode. This period of time is terminated when the charge previously stored in the diode is depleted, and thereafter the flow of reverse current through the diode is blocked.

The base of transistor 108 is connected through resistor 106 to the common collectors of transistors 111 and 112, and antisaturation diode 107 is connected between the base and the collector of transistor 108, diode 107 being poled for forward current in the direction of the collector of transistor 108. The collector of transistor 108 is connected to output terminal 118. The emitter of transistor 108 is connected via diode 105 over conduction path 115 to the base of transistor 111, diode 105 being poled for forward current in the direction of the base of transistor 115, and the base of transistor 103 is connected through resistor 119 to the common collector of transistors 111 and 112. The collector of transistor 103 is connected through resistor 102 to positive source 101.

The circuit in FIG. 1 operates in the following manner. The values of positive sources 101 and 116 and resistors 106, 110, and 119 are selected such that transistors 103 and 108 are normally ON, that is, in a conducting state. Transistor 103 is saturated, but transistor 108, as a result of diode 107, is not saturated. Thus, with transistors 103 and 108 ON, a current flows from positive source 116 through resistor 109, transistor 108, charge storage diode 104 (in the forward direction), and transistor 103 to ground. As described above, charge storage diode 104 accumulates charge when the circuit is in this state. Transistors 111 and 112 are OFF, that is, they do not conduct current.

To trigger the circuit to its unstable state, a positive pulse is applied at the input terminal. This turns transistor 112 ON and a current flows from positive source 116 through resistor 110 and transistor 112 to ground. The resulting decrease in voltage at the collector of transistor 112 is transmitted via respective conduction paths through resistors 106 and 119 to the bases of transistors 108 and 103. The decrease in voltage at the bases of transistors 108 and 103 turns these transistors OFF and the current in the forward direction through charge storage diode 104 is terminated.

At this time transistor 111 is turned ON, and a current flows from positive source 101 through resistor 102, through charge storage diode 104 in the reverse direction, and through diode 105 to the base of transistor 111. Charge storage diode 104 conducts this reverse current because, as described above, charge has previously been stored near the PN junction thereof. With transistor 103 and 108 OFF, transistor 111 ON and charge storage diode 104 conducting in the reverse direction, the circuit is in its unstable state. The circuit remains in this state until the charge previously stored in charge storage diode 104 is depleted by the reverse current therethrough. When this occurs, current flow from positive source 101 through charge storage diode 104 and over conduction path 115 to the base of transistor 111 is terminated, and transistor 111 is turned OFF. Since the positive input pulse has now passed, the voltage at the collectors of transistors 111 and 112 rises. This voltage increase is transmitted via respective conduction paths through resistors 106 and 119 to the bases of transistors 108 and 103, thereby turning these transistors ON. Accordingly, a current flows from positive source 116 over the conduction path previously described through transistors 108 and 103 and through charge storage diode 104 in the forward direction. Thus the circuit is returned to its stable state, where it remains until another positive pulse is applied at the input terminal.

A voltage output from this monostable circuit may be obtained at either output terminal 117 or output terminal 118. When the circuit is in its stable state a small current flows through resistor 110, and accordingly the voltage at output terminal 117 is approximately equal to the voltage at positive source 116. On the other hand, the voltage at output terminal 118 can be at a somewhat lower level as a result of current flow through resistor 109. When the circuit is triggered to its unstable state, however, the voltage at output terminal 117 falls to a lower level approximately equal to ground potential and the voltage at output terminal 118 increases to a level approximately equal to the voltage at positive source 116.

Figure 2:
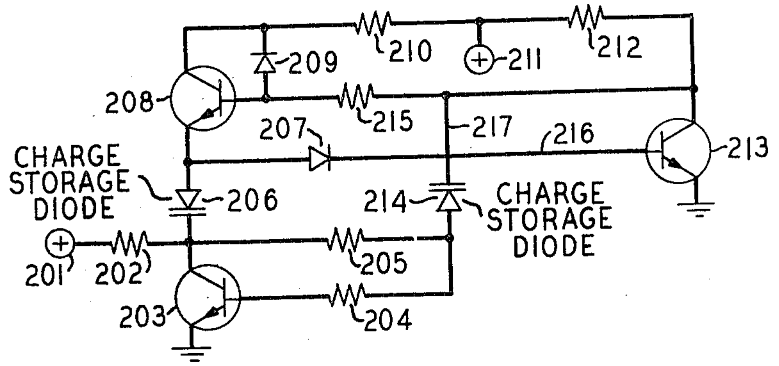
FIG. 2 is a schematic diagram of a self-starting astable circuit constructed in accordance with the invention.

An astable circuit employing two charge storage diodes for timing purposes is shown in FIG. 2. This circuit basically comprises two conduction paths leading through active switching elements. One such conduction path extends from positive source 211 through resistor 210, transistor 208, charge storage diode 206, and transistor 203 to ground. The other conduction path extends from positive source 211 through resistor 212 and transistor 213 to ground. Antisaturation diode 209 is connected between the base and the collector of transistor 208, diode 209 being poled for forward current in the direction of the collector of transistor 208. The base of transistor 208 is connected through resistor 215 to the collector of transistor 213. The emitter of transistor 208 is connected via diode 207 over conduction path 216 to the base of transistor 213, diode 207 being poled for forward current in the direction of the base of transistor 213. The collector of transistor 203 is connected via resistor 202 to positive source 201 and over conduction path 217 via resistor 205 and charge storage diode 214 to the collector of transistor 213. The base of transistor 203 is connected through resistor 204 to a point on conduction path 217 between resistor 205 and charge storage diode 214. As shown, charge storage diode 214 is poled for forward current in the direction of the collector of transistor 213, and change storage diode 206 is poled for forward current in the direction of the collector of transistor 203.

The operation of the circuit in FIG. 2 will now be described. When the voltage from positive sources 201 and 211 is applied to the circuit, transistor 203, 208 and 213 are in their active regions in an unstable condition. Noise imbalance in the circuit creates an oscillatory condition through transistors 203, 208 and 213 which increases in amplitude until either transistor 203 or transistor 213 becomes saturated, and the other is accordingly turned OFF. Assume initially that transistor 213 becomes saturated and transistor 203 is turned OFF. The voltage at the collector of transistor 213 is applied through resistor 215 to the base of transistor 208, thereby maintaining transistor 208 in an OFF condition. With transistor 213 ON and transistors 203 and 208 OFF, a current flows from positive source 201 through resistor 202, resistor 205, charge storage diode 214 in the forward direction, and transistor 213 to ground. Transistor 213 is maintained ON by a base current which flows from positive source 201 through resistor 202, charge storage diode 206 in the reverse direction and diode 207, charge having seen stored in diode 206 during the oscillatory period. When the charge stored in charge storage diode 206 is depleted, current therethrough is blocked and transistor 213 is turned OFF. This increases the voltage at the collector of transistor 213 and this increase, applied through resistor 215 to the base of transistor 208, turns transistor 208 ON. Since charge has been stored in charge storage diode 214 by a forward current therethrough, a current flows from positive source 211 through resistor 212 and over conduction path 217 through charge storage diode 214 and resistor 204 to the base of transistor 203, thereby turning transistor 203 ON.

With transistors 203 and 208 turned ON and transistor 213 turned OFF, the circuit is in its second astable state. This state persists until the charge stored in charge storage diode 214 is depleted and current therethrough is blocked. When the reverse current flowing through charge storage diode 214 to base of transistor 203 is blocked, transistor 203 is turned OFF. With transistor 203 turned OFF, current again flows from positive source 201 through resistor 202, charge storage diode 206, and diode 207 to the base of transistor 213, turning transistor 213 ON. This, as described above, turns transistor 208 OFF, and the circuit is returned to its first astable state.

Figure 3:
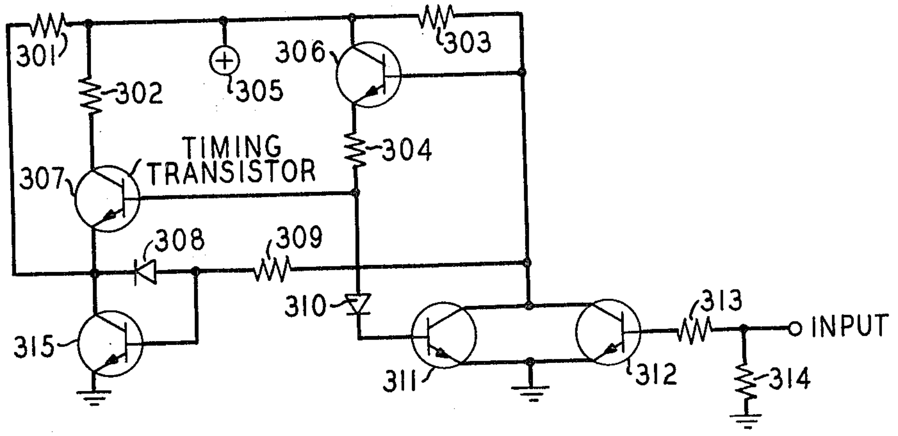
FIG. 3 is a schematic diagram of a monostable circuit constructed in accordance with the invention.

A monostable circuit using charge storage near the collector-base junction of a transistor is shown in FIG. 3. Timing for this circuit is provided by timing transistor 307. The collector of transistor 307 is connected through resistor 302 to positive source 305, and the emitter of transistor 307 is connected to the collector of transistor 315. The emitter of transistor 315 is connected to ground.

The input terminal is connected through resistor 314 to ground and through resistor 313 to the base of transistor 312. The collector and emitter of transistor 312 are connected respectively to the collector and emitter of transistor 311, and the emitters of transistors 311 and 312 are connected to ground. The collectors of transistors 311 and 312 are connected via resistor 303 to positive source 305. Positive source 305 is connected the collector of transistor 306. The emitter of transistor 306 is connected through resistor 304 and diode 310 to the base of transistor 311, diode 310 being poled for forward current in the direction of the base of transistor 311. The base of timing transistor 307 is connected to a point on this conduction path between resistor 304 and diode 310. The base of transistor 306 is connected to the collectors of transistors 311 and 312.

The collectors of transistors 311 and 312 are connected through resistor 309 to the base of transistor 315, and antisaturation diode 308 is connected from the base to the collector of transistor 315, diode 308 being poled for forward current in the direction of the collector of transistor 315. To complete the structure of the circuit, the collector of transistor 315 is connected through resistor 301 to positive source 305.

The operation of the circuit in FIG. 3 is as follows. The circuit values are chosen such that transistors 306, 307, and 315 are normally ON, and transistors 311 and 312 are normally OFF. Accordingly, current flows from positive source 305 through resistor 302, timing transistor 307, and transistor 315 to ground. Timing transistor 307 is saturated, and charge is stored in the vicinity of the collector-base junction thereof. Current flows from source 305 through resistors 303 and 309 to the base of transistor 315, maintaining transistor 315 conducting during the stable state of the circuit. Current also flows from positive source 305 through transistor 306 and resistor 304 to the base of timing transistor 307.

To switch the circuit to its unstable state a positive pulse is applied at the input terminal. This turns transistor 312 ON and reduces the voltage at the collector of transistor 311 and 312. Accordingly, transistor 306 is turned OFF, and transistor 315 is turned OFF through the path including resistor 309. The charge stored near the collector-base junction of timing transistor 307 permits a reverse current to flow therethrough for a predetermined period of time, and accordingly a current flows from positive source 305 through resistor 302, through the collector-base junction of timing transistor 307, and through diode 310 to the base of transistor 311, thereby turning transistor 311 ON.

This unstable state persists as long as there is an excess of charge stored near the collector-base junction of timing transistor 307. When this charge is depleted, conduction across the collector-base junction of timing transistor 307 is blocked, and transistor 311 is turned OFF. This increases the voltage at the collectors of transistors 311 and 312, and accordingly turns transistors 306 and 315 ON. With transistor 306 turned ON, timing transistor 307 is again turned ON, and the circuit is returned to its original stable state.

It is thus apparent that at least one of the two active switching elements in each of FIGS. 1, 2 and 3 (respectively, transistors 103 and 108 and transistor 111 in FIG. 1, transistors 203 and 208 and transistor 213 in FIG. 2, and transistors 306 and 315 and transister 311 in FIG. 3) has associated therewith a PN junction which stores charge when a forward current flows through the PN junction and conducts a reverse current for a predetermined period of time after the PN junction becomes reversely biased. When the charge stored in the PN junction is depleted, the reverse current therethrough is blocked and the circuit is switched back to its original state.

While the specific embodiments described herein use charge storage diodes and transistors to provide charge storage, it is apparent that any semiconductor elements having PN junctions could also be used for the same purpose.

We claim:

1. A regenerative circuit having first and second states comprising:

a first switching element comprising a first transistor, a second transistor, and semiconductor element with a PN junction having a long minority carrier lifetime which are connected in a first conduction path;

a second switching element comprising a third transistor which is connected in a second conduction path; wherein said semiconductor element stores charge in response to a forward current through said PN junction when said regenerative circuit is in said first state, and said semiconductor element allows a reverse current to flow through said PN junction for a predetermined period of time when said regenerative circuit is in said second state to maintain said circuit in said second state.

2. A regenerative circuit having first and second states comprising:

a first switching element, said first switching element comprising a first transistor and a second transistor connected in a first conduction path and a third transistor connected in a second conduction path, said second conduction path connecting to said second transistor;

a second switching element, said second switching element comprising a fourth transistor connected in a third conduction path, said third conduction path connecting to said first transistor, and said fourth transistor connecting to said second conduction path; wherein a PN junction in said second transistor having a long minority carrier lifetime stores charge in response to a forward current through said PN junction when said regenerative circuit is in said first state; and wherein said PN junction allows a reverse current to flow through said PN junction for a predetermined period of time when said regeneration circuit is in said second state to maintain said circuit in said second state.

3. A regenerative circuit having first and second states comprising:

a first voltage source;

first and second switching elements connected to said first source; wherein said first switching element comprises first and second transistors connected in series in a first conduction path and said second switching element comprises a third transistor connected into a second conduction path, said first and second conduction paths being connected in parallel to said first voltage source;

a semiconductor element with PN junction having a long minority carrier lifetime is connected in said first conduction path between said first and second transistors and poled in a forward direction with respect to said first voltage source, said semiconductor element storing charge in response to a forward current through said PN junction when said first switching element is in a conducting state during said first state and said semiconductor element allowing a reverse current to flow through said PN junction for a predetermined period of time when said circuit is in said second state; and wherein said second switching element is maintained in a conducting state during said second state by said reverse current through said PN junction.

4. A regenerative circuit as in claim 3 additionally comprising a second voltage source connected so as to reverse bias said diode and connected through said diode to the base of said third transistor.

5. A regenerative circuit as in claim 4 comprising third and fourth conduction paths connected respectively between the bases of said first and second transistors and said second conduction path.

6. A regenerative circuit as in claim 4 in which said semiconductor element is a diode, said regenerative circuit comprising a second diode having a long minority carrier lifetime connected between said second voltage source and said second conduction path and poled in a forward direction with respect to said second voltage source.

7. A regenerative circuit as in claim 6 comprising third and fourth conduction paths connected respectively between the bases of said first and second transistors and said second conduction path.

8. A regenerative circuit as in claim 6 in which:

said second diode having a long minority carrier lifetime is connected in a third conduction path between said second voltage source and said second conduction path; and the base of said second transistor is connected by a fourth conduction path to said second conduction path, and the base of said first transistor is connected by a fifth conduction path to said third conduction path.

9. A regenerative circuit having first and second states comprising:

a first voltage source;

first and second switching elements connected to said first voltage source;

said first switching element comprising a first conduction path connected to said first voltage source with a first transistor serially connected therein, said first element also including a second conduction path with a third transistor connected therein, said second conduction path being connected between said first voltage source and the base of said second transistor said second switching element including a third conduction path connected to said first voltage source with a fourth transistor connected therein, the base of said fourth transistor being connected to said second conduction path;

wherein a PN junction in said first transistor stores charge in response to a forward current through said PN junction when said first switching element is conducting in said first state, and said first transistor allows a reverse current to flow through said PN junction for a predetermined period of time to maintain said second switching element conducting in said second state.

10. A regenerative circuit as in claim 9 wherein said PN junction comprises the collector-base junction of said second transistor.